United States Patent
Shukla et al.

(10) Patent No.: US 11,689,154 B2
(45) Date of Patent: *Jun. 27, 2023

(54) SYSTEMS AND METHODS FOR DISTRIBUTED-SOLAR POWER FORECASTING USING PARAMETER REGULARIZATION

(71) Applicant: Utopus Insights, Inc., Valhalla, NY (US)

(72) Inventors: Srivats Shukla, Elmsford, NY (US); Younghun Kim, Pleasantville, NY (US); Aijun Deng, White Plains, NY (US)

(73) Assignee: Utopus Insights, Inc., Valhalla, NY (US)

( * ) Notice: Subject to any disclaimer, the term of this patent is extended or adjusted under 35 U.S.C. 154(b) by 92 days.

This patent is subject to a terminal disclaimer.

(21) Appl. No.: 17/462,971

(22) Filed: Aug. 31, 2021

(65) Prior Publication Data
US 2021/0405253 A1  Dec. 30, 2021

Related U.S. Application Data

(63) Continuation of application No. 16/235,283, filed on Dec. 28, 2018, now Pat. No. 11,105,958.

(51) Int. Cl.
*G01W 1/10* (2006.01)
*H02S 50/00* (2014.01)
(Continued)

(52) U.S. Cl.
CPC ............. *H02S 50/00* (2013.01); *G01W 1/10* (2013.01); *G08B 21/18* (2013.01); *H02J 3/004* (2020.01);
(Continued)

(58) Field of Classification Search
CPC ...... G01W 1/10; G01W 2203/00; H02S 50/00; G08B 21/18; G08B 21/182; H02J 3/004;
(Continued)

(56) References Cited

U.S. PATENT DOCUMENTS 8,209,124 B2 * 6/2012 Dannevik ............... G01W 1/10
702/3
8,413,500 B2 * 4/2013 Ely, III .................. G01W 1/10
73/170.01
(Continued)

FOREIGN PATENT DOCUMENTS

CN      102570453 A    7/2012
CN      102930177 A    2/2013
(Continued)

OTHER PUBLICATIONS

AjitTyagi , Sep. 2000, 14 pages, Mesoscale weather prediction (Year: 2000).
(Continued)

*Primary Examiner* — Tung S Lau
(74) *Attorney, Agent, or Firm* — Ahmann Kloke LLP

(57) ABSTRACT

An example method comprises receiving first historical meso-scale numerical weather predictions (NWP) and power flow information for a geographic distribution area, correcting for overfitting of the historical NWP predictions, reducing parameters in the first historical NWP predictions, training first power flow models using the first reduced, corrected historical NWP predictions and the historical power flow information for all or parts of the first geographic distribution area, receiving current NWP predictions for the first geographic distribution area, applying any number of first power flow models to the current NWP predictions to generate any number of power flow predictions, comparing one or more of the any number of power flow predictions to one or more first thresholds to determine significance of
(Continued)

reverse power flows, and generating a first report including at least one prediction of the reverse power flow and identifying the first geographic distribution area.

23 Claims, 11 Drawing Sheets

(51) Int. Cl.
  *G08B 21/18* (2006.01)
  *H02J 3/38* (2006.01)
  *H02J 3/00* (2006.01)
(52) U.S. Cl.
  CPC ............... *H02J 3/38* (2013.01); *H02J 3/381* (2013.01); *G01W 2203/00* (2013.01); *H02J 2203/20* (2020.01); *H02J 2300/24* (2020.01)
(58) Field of Classification Search
  CPC .......... H02J 3/38; H02J 3/381; H02J 2203/20; H02J 2300/24; Y02E 10/56; Y04S 10/50
  See application file for complete search history.

(56) References Cited

U.S. PATENT DOCUMENTS

| | | | |
|---|---|---|---|
| 8,521,426 B2* | 8/2013 | Kelly | G08G 1/096888 701/465 |
| 9,009,087 B1 | 4/2015 | Mewes et al. | |
| 9,274,250 B2* | 3/2016 | Pasken | G01W 1/10 |
| 11,105,958 B2* | 8/2021 | Shukla | H02J 3/381 |
| 11,144,835 B2* | 10/2021 | Anagnostou | G06Q 10/04 |
| 2010/0131202 A1* | 5/2010 | Dannevik | G01W 1/00 702/181 |
| 2010/0180694 A1* | 7/2010 | Ely, III | G01W 1/10 73/861.42 |
| 2012/0050750 A1 | 3/2012 | Hays et al. | |
| 2012/0330549 A1* | 12/2012 | Dannevik | G01W 1/10 702/3 |
| 2013/0006534 A1 | 1/2013 | Kelly et al. | |
| 2013/0314694 A1 | 11/2013 | Tchoryk et al. | |
| 2013/0346043 A1 | 12/2013 | Mewes et al. | |
| 2014/0244188 A1 | 8/2014 | Bai et al. | |
| 2014/0257782 A1 | 9/2014 | Davis et al. | |
| 2014/0358486 A1 | 12/2014 | Osborne | |
| 2015/0193713 A1* | 7/2015 | Giunta | G06Q 10/04 705/7.25 |
| 2016/0231463 A1 | 8/2016 | Smith | |
| 2018/0216961 A1 | 8/2018 | Mantovani et al. | |
| 2021/0271934 A1* | 9/2021 | White | G06V 20/13 |

FOREIGN PATENT DOCUMENTS

| | | |
|---|---|---|
| CN | 103489046 A | 1/2014 |
| CN | 103514341 A | 1/2014 |
| CN | 103971169 A | 8/2014 |
| CN | 106339568 A | 1/2017 |
| CN | 109447315 A | 3/2019 |
| CN | 109636076 A | 4/2019 |
| WO | 2020140127 A1 | 7/2020 |

OTHER PUBLICATIONS

Clifford F. Mass, Regional Real-Time Numerical Weather Prediction: Current Status and Future Potential, Oct. 27, 1997, 12 pages (Year: 1997).
Harold Gamarro, On the Assessment of a Numerical Weather Prediction Model for Solar Photovoltaic Power Forecasts in Cities, 7 pages, 2019 (Year: 2019).
International Application No. PCT/US2019/069003, Search Report and Written Opinion dated Apr. 21, 2020.
Jake Badger (Wind-Climate Estimation Based on Mesoscale and Microscale Modeling: Statistical-Dynamical Downscaling for Wind Energy Applications, 19 pages, Aug. 2014) (Year: 2014).
Jimy Dudhia, A History of Mesoscale Model Development, 11 pages, Oct. 2013 (Year: 2013).
K.G. Rados in Application of a Mesoscale Weather Prediction Model for Short-Term Forecasting of Power Production of Wind Farms in Complex Terrain—Test Case: Island of Crete, 9 pages, Sep. 2007 (Year: 2007).
Ken-ichi Shimose, Improvement of the Japan Meteorological Agency Meso-Scale Model for the Forecasting the Photovoltaic Power Production: Modification of the Cloud Scheme, 2014, 8 pages (Year: 2014).
Meso-Scale Forecasts, printed Apr. 12, 2021. 6 pages (Year: 2021).
Roland R. Draxler (The Use of Global and Mesoscale Meteorological Model Data to Predict the Transport and Dispersion of Tracer Plumes over Washington, D.C, 12 pages, Jun. 2006) (Year: 2006).
The State-Of-The-Art in Short-Term Prediction of Wind Power, 36 pages, Aug. 2003 (Year: 2003).
Wataru Ohfuchi, 10-km Mesh Meso-scale Resolving Simulations of the Global Atmosphere on the Earth Simulator, 28 pages, Apr. 26, 2004 (Year: 2004).
Wind Power Forecasting: State-of-the-Art2009, 216 pages , Nov. 2009 (Year: 2009).
Ying-Hwa Kuo, Mesoscale Numerical Weather Prediction, 9 pages, printed Apr. 12, 2021 (Year: 2021).

* cited by examiner

SYSTEMS AND METHODS FOR DISTRIBUTED-SOLAR POWER FORECASTING USING PARAMETER REGULARIZATION

CROSS-REFERENCE TO RELATED APPLICATIONS

This application is a continuation of U.S. patent application Ser. No. 16/235,283, filed on Dec. 28, 2018 and entitled "SYSTEMS AND METHODS DISTRIBUTED-SOLAR POWER FORECASTING USING PARAMETER REGULARIZATION", which is incorporated herein by reference in its entirety.

FIELD OF THE INVENTION

Embodiments of the present invention(s) relate generally to distributed solar power forecasting in electrical networks. In particular, the present invention(s) relate to distributed solar power forecasting to multiple portions of a distributed geographic area using numerical weather prediction with improved accuracy and scalability in electrical networks.

DESCRIPTION OF RELATED ART

Home and commercial solar panel installations have become ubiquitous. The prior art has a problem of forecasting net renewable power generation dispersed in a power distribution territory while making the forecasting models computationally scalable and accurate. Existing methods of solving this problem either do not produce accurate forecasts (leading to unpredictable reverse power flows through power substations) or compromise the computational efficiency of the models for achieving higher accuracy.

SUMMARY

An example non-transitory computer readable medium comprising executable instructions, the executable instructions being executable by one or more processors to perform a method, the method comprising receiving first historical meso-scale numerical weather predictions (NWP) for a first geographic distribution area for a first time period, receiving first power flow information for the first geographic distribution area of the first time period, correcting for overfitting of the first historical meso-scale NWP predictions to reduce correlations within the first historical meso-scale NWP predictions and improve accuracy and create first corrected historical meso-scale NWP predictions, reducing parameters in the first corrected historical meso-scale NWP predictions to improve scalability and create first reduced, corrected historical meso-scale NWP predictions, training first power flow models using the first reduced, corrected historical meso-scale NWP predictions and the first power flow information for all or parts of the first geographic distribution area, receiving first current meso-scale numerical weather predictions (NWP) for the first geographic distribution area for a first future time period, applying any number of first power flow models to the first current meso-scale numerical weather predictions (NWP) to generate any number of power flow predictions that predict power flow within or from portions of the first geographic distribution area, comparing one or more of the any number of power flow predictions to one or more first thresholds to determine significance of reverse power flows, and generating a first report including at least one prediction of the reverse power flow based on the comparison and identifying the first geographic distribution area that may be impacted by the at least one prediction of the reverse power flow.

The method may further comprise identifying a portion of the first geographic distribution area, identifying one or more electrical assets that distributes power to the portion of the first geographic distribution area, and generating an alert to a digital device based on the at least one prediction of the reverse power flow that may impact the one or more electrical assets that distributes power to the portion of the first geographic distribution area. The one or more electrical assets that distributes power to the portion of the first geographic distribution area may include at least one substation and the alert is delivered to a digital device authorized to receive alerts for that at least one substation. The one or more electrical assets that distributes power to the portion of the first geographic distribution area may include at least two different substations and the alert is delivered to at least one digital device authorized to receive alerts for at least one of the at least two different substations.

In some embodiments, the method further comprises receiving second historical meso-scale numerical weather predictions (NWP) for a second geographic distribution area for a first time period, receiving second power flow information for the second geographic distribution area of the first time period, correcting for overfitting of the second historical meso-scale NWP predictions to reduce correlations within the second historical meso-scale NWP predictions and improve accuracy and create second corrected historical meso-scale NWP predictions, reducing parameters in the second corrected historical meso-scale NWP predictions to improve scalability and create second reduced, corrected historical meso-scale NWP prediction, training second power flow models using the second reduced, corrected historical meso-scale NWP predictions and the second power flow information for all or parts of the second geographic distribution area, the training of the second power flow models being at substantially a similar time as training the first power flow models due to improved scalability of model creation, receiving second current meso-scale numerical weather predictions (NWP) for the second geographic distribution area for a second future time period, applying any number of second power flow models to the second current meso-scale numerical weather predictions (NWP) to generate any number of power flow predictions that predict power flow within or from portions of the second geographic distribution area, comparing one or more of the any number of power flow predictions to one or more second thresholds to determine significance of reverse power flows, and generating a second report including at least one prediction of the reverse power flow based on the comparison and identifying the second geographic distribution area that may be impacted by the at least one prediction of the reverse power flow.

In various embodiments, the one or more first thresholds are different than the one or more second thresholds, the one or more first thresholds being based on an attribute of a first electrical asset that distributes power within the first geographic area, and the one or more second thresholds being based on an attribute of a second electrical asset that distributes power within the second geographic area.

Applying the any number of first power flow models to the first current meso-scale numerical weather predictions (NWP) to generate the any number of power flow predictions that predict the power flow within or from portions of the first geographic distribution area may further comprise correcting for overfitting of the first current meso-scale NWP predictions to reduce correlations within the first current meso-scale NWP predictions prior to applying the any number of first power flow models. In some embodiments, applying the any number of first power flow models to the first current meso-scale numerical weather predictions (NWP) to generate the any number of power flow predictions that predict the power flow within or from portions of the first geographic distribution area further comprises reducing parameters in the current meso-scale NWP predictions prior to applying the any number of first power flow models but after correcting for overfitting.

Correcting for overfitting of the first historical meso-scale NWP predictions to reduce the correlations within the first historical meso-scale NWP predictions may comprise applying a Least Absolute Shrinkage and Selection Operator (LASSO) to all or part of the first historical meso-scale NWP predictions.

An example system comprises at least one processor and memory containing instructions, the instructions being executable by the at least one processor to: receive a first historical meso-scale numerical weather predictions (NWP) for a first geographic distribution area for a first time period, receive first power flow information for the first geographic distribution area of the first time period, correct for overfitting of the first historical meso-scale NWP predictions to reduce correlations within the first historical meso-scale NWP predictions and improve accuracy and create first corrected historical meso-scale NWP predictions, reduce parameters in the first corrected historical meso-scale NWP predictions to improve scalability and create first reduced, corrected historical meso-scale NWP predictions, train first power flow models using the first reduced, corrected historical meso-scale NWP predictions and the first power flow information for all or parts of the first geographic distribution area, receive first current meso-scale numerical weather predictions (NWP) for the first geographic distribution area for a first future time period, apply any number of first power flow models to the first current meso-scale numerical weather predictions (NWP) to generate any number of power flow predictions that predict power flow within or from portions of the first geographic distribution area, compare one or more of the any number of power flow predictions to one or more first thresholds to determine significance of reverse power flows, and generate a first report including at least one prediction of the reverse power flow based on the comparison and identifying the first geographic distribution area that may be impacted by the at least one prediction of the reverse power flow.

An example method comprises receiving first historical meso-scale numerical weather predictions (NWP) for a first geographic distribution area for a first time period, receiving first power flow information for the first geographic distribution area of the first time period, correcting for overfitting of the first historical meso-scale NWP predictions to reduce correlations within the first historical meso-scale NWP predictions and improve accuracy and create first corrected historical meso-scale NWP predictions, reducing parameters in the first corrected historical meso-scale NWP predictions to improve scalability and create first reduced, corrected historical meso-scale NWP predictions, training first power flow models using the first reduced, corrected historical meso-scale NWP predictions and the first power flow information for all or parts of the first geographic distribution area, receiving first current meso-scale numerical weather predictions (NWP) for the first geographic distribution area for a first future time period, applying any number of first power flow models to the first current meso-scale numerical weather predictions (NWP) to generate any number of power flow predictions that predict power flow within or from portions of the first geographic distribution area, comparing one or more of the any number of power flow predictions to one or more first thresholds to determine significance of reverse power flows, and generating a first report including at least one prediction of the reverse power flow based on the comparison and identifying the first geographic distribution area that may be impacted by the at least one prediction of the reverse power flow.

DETAILED DESCRIPTION

Various embodiments described herein discuss forecasting net renewable power generation dispersed in a power distribution territory while making the power forecasting models computationally scalable and accurate. The process may produce accurate power forecasts to avoid unpredictable reverse power flows through power substations and improve computational efficiency of the models for achieving higher accuracy.

Solar power generation examples are discussed herein, where the net-generation includes both stand-alone PV (Photo-Voltaic) farms and roof-top PV installed by residential customers. In some embodiments, systems and methods discussed herein may be utilized to forecast net-generation of roof-top PV, stand-alone PV farms, or a combination of the two. For example, systems and methods discussed herein may be utilized to forecast net-generation of roof-top PV without accounting for stand-alone PV farms and/or other types of renewable energy assets (e.g., wind turbines).

The net power generated could be estimated/measured at a feeder, substation, utility or an entire state level. It will be appreciated that systems and methods discussed herein may include any renewable power generation devices dispersed through a power distribution territory (e.g., an area in which power is distributed to many destinations such as a suburb and/or a concentration of manufacturing facilities).

Various embodiments described herein combine a meso-scale weather forecasting technique with parameter regularization models to create forecasting models for distributed solar power generation which are computationally scalable and produce accurate forecasts under different types of weather conditions by avoiding over-fitting. As a result, systems and methods described herein may forecast distributed solar power and the combined effect on a transmission grid.

Figure 1:
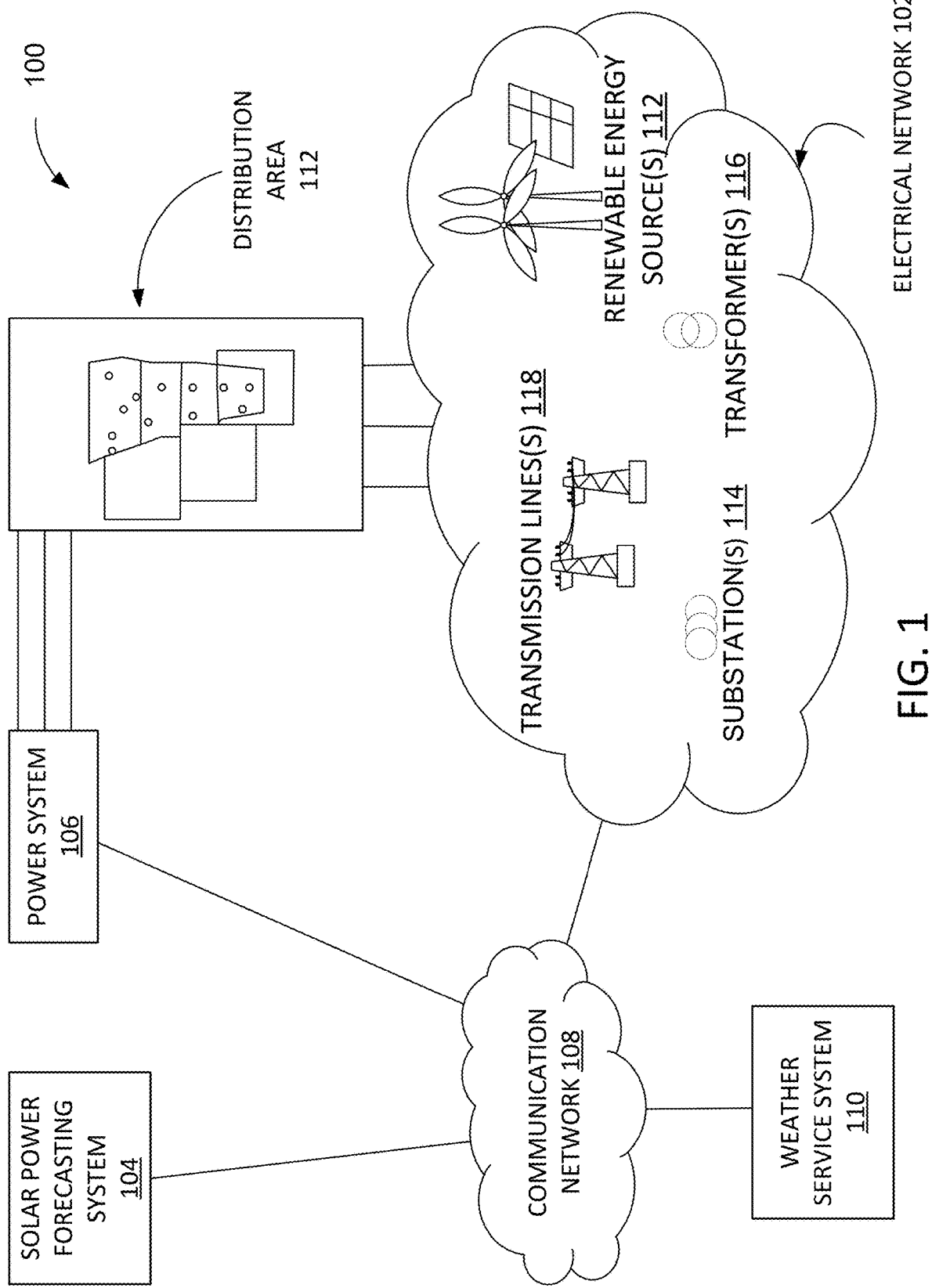
FIG. 1 depicts a block diagram of an example of an electrical network in some embodiments.

FIG. 1 depicts a block diagram 100 of an example of an electrical network 102 in some embodiments. FIG. 1 includes an electrical network 102, a solar power forecasting system 104, a power system 106, a weather service system 110 in communication over a communication network 108. The electrical network 102 includes any number of transmission lines 118, renewable energy sources 112, substations 114, and transformers 116 that provide power to a distribution area 112. The distribution area 112 is any geographic area receives power from the electrical network 102. The distribution area may further include PV generators that generate power for use within the distribution area 112 (e.g., for a home or facility) and may provide power back to electrical assets of the electrical network 102. The electrical network 102 may include any number of electrical assets including protective assets (e.g., relays or other circuits to protect one or more assets), transmission assets (e.g., lines, or devices for delivering or receiving power), and/or loads (e.g., residential houses, commercial businesses, and/or the like).

Components of the electrical network 102 such as the transmission line(s) 118, the renewable energy source(s) 112, substation(s) 114, and/or transformer(s) 106 may inject energy or power (or assist in the injection of energy or power) into the electrical network 102. Each component of the electrical network 102 may be represented by any number of nodes in a network representation of the electrical network. Renewable energy sources 112 may include solar panels, wind turbines, and/or other forms of so called "green energy." The electrical network 102 may include a wide electrical network grid (e.g., with 40,000 assets or more).

Each component of the electrical network 102 may represent one or more elements of their respective components. For example, the transformer(s) 116, as shown in FIG. 1 may represent any number of transformers which make up electrical network 102.

In some embodiments, communication network 108 represents one or more computer networks (e.g., LAN, WAN, and/or the like). Communication network 108 may provide communication between any of the solar power forecasting system 104, the power system 106, and/or the electrical network 102. In some implementations, communication network 108 comprises computer devices, routers, cables, uses, and/or other network topologies. In some embodiments, communication network 108 may be wired and/or wireless. In various embodiments, communication network 108 may comprise the Internet, one or more networks that may be public, private, IP-based, non-IP based, and so forth.

The solar power forecasting system 104 may include any number of digital devices configured to forecast solar power generation of any number of PV generators in the distribution area 112.

In various embodiments, the solar power forecasting system 104 may reduce computational burden and improve accuracy of solar power generation forecasting by leveraging meso-scale numerical weather predictions (NWP) for the distribution area 112 provided by the weather service system 110. The solar power forecasting system 104 may correct for overfitting caused by the information provided in the meso-scale NWP as well as reduce parameters to improve scaling and accuracy. Using corrected, reduced historical meso-scale NWP and historical power flows for training power flow models, the solar power forecasting system 104 may generate power flow models with improved accuracy. Similarly, the training of such power flow models and generation of such models for different geographic areas (e.g., different distribution areas) is greatly improved.

The power system 106 may include any number of digital devices configured to control distribution and/or transmission of energy. The power system 106 may, in one example, be controlled by a power company, utility, and/or the like. A digital device is any device with at least one processor and memory. Examples of systems, environments, and/or configurations that may be suitable for use with system include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

A computer system may be described in the general context of computer system executable instructions, such as program modules, being executed by a computer system. Generally, program modules may include routines, programs, objects, components, logic, data structures, and so on that perform particular tasks or implement particular abstract data types. A digital device, such as a computer system, is further described with regard to FIG. 10.

The weather service system 110 is any service or provider that may provide the meso-scale NWP. The weather service system 110 may be a part of a national service (e.g., one of the National Centers for Environmental Prediction) or other entity.

The solar power forecasting system 104 may provide predictions for any number of distribution areas (beyond the single distributed area 112 depicted in FIG. 100). It will be appreciated that due to improved scalability and accuracy of power flow model training using meso-scale NWP predictions for one distribution area 112, the same solar power forecasting system 104 may efficiently and quickly generate power flow models and analyze new meso-scale NWP predictions for a plurality of different geographic distribution areas (e.g., enabled by scalability of the system; otherwise the same solar power forecasting system 104 may not be able to provide power flow or solar power flow predictions in time to take action).

Figure 2:
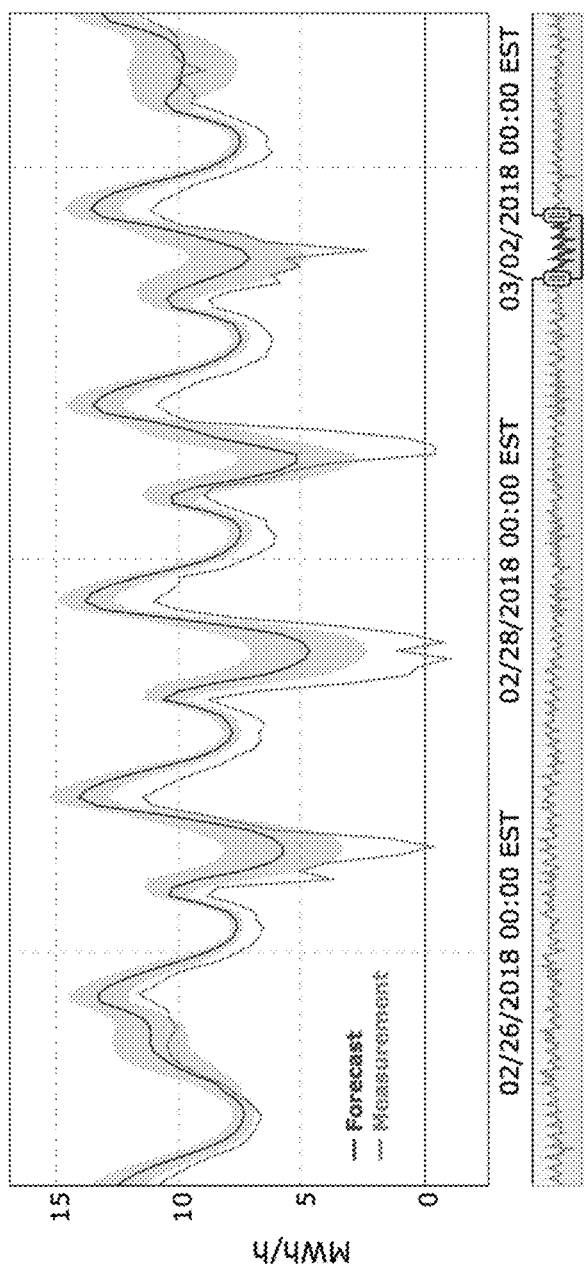
FIG. 2 depicts reverse power flow in the prior art.

FIG. 2 depicts reverse power flow in the prior art. Over-forecasting net demand, or under-forecasting distributed PV leads to unpredictable reverse power flow through substations. Reverse power flow occurs when power flows from the customers to a utility substation (negative measurements), as opposed to the usual scenario where the power flows from the utility substation to the residential/commercial buildings. This creates protection equipment failure, damage, and loss of revenue.

In an example depicted by FIG. 2, forecasted and measured power flowing through a power company substation is graphed with measurements below zero indicating reverse power flow on three separate occasions.

This is a recurrent problem for utilities with high penetration of solar power generation (e.g., a high number of PV systems onboarding power throughout a power distribution area), especially on extremely sunny days or extremely snowy days (leading to under-forecasting). Other "state-of-the-art" techniques perform well under normal conditions of weather, they do not perform accurately under all possible weather conditions. This may happen due to a couple of reasons:

1) All types of weather (snowy, rainy, highly sunny) days may not be covered in a training set, which leads to over-fitting, and worse predictions under conditions not present in the training set; and 2) The averaged weather features over a large area do not capture the local conditions completely.

Various embodiments discussed herein provide for a computationally efficient and accurate forecasting for different weather conditions and avoidance of over and under forecasting.

Figure 3:
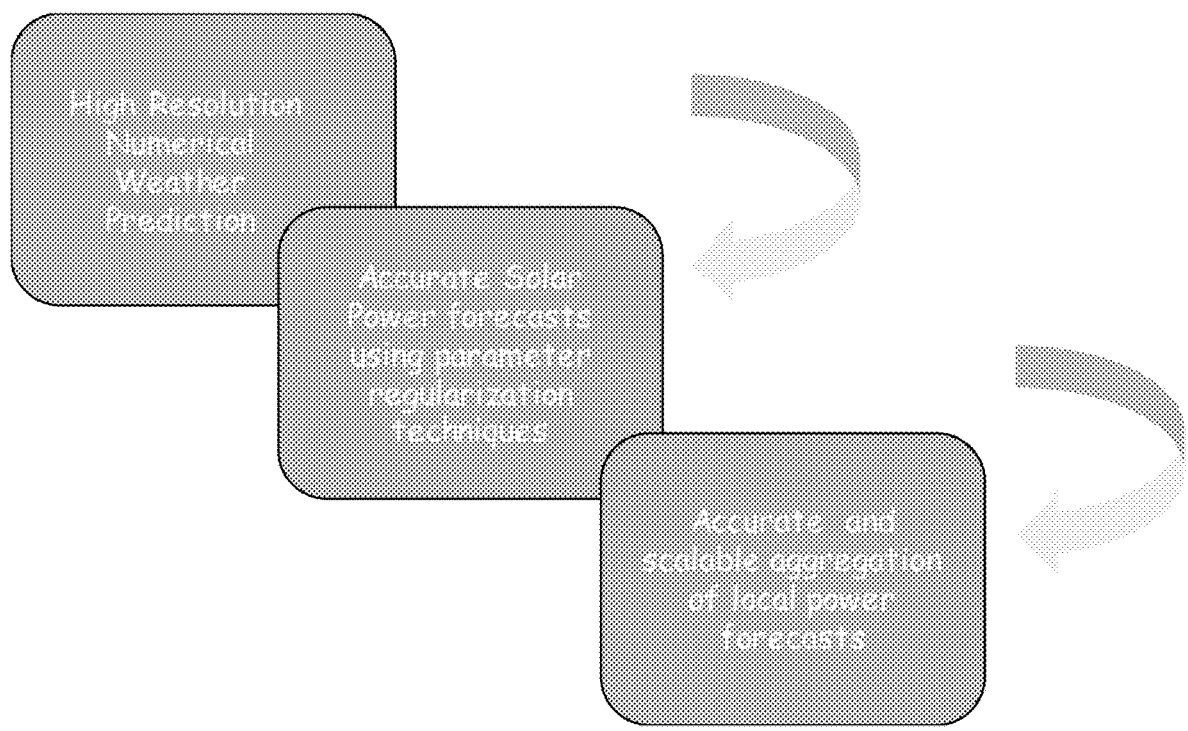
FIG. 3 depicts a three pronged approach to combination of meso-scale numerical weather forecasting and parameter reduction techniques in some embodiments.

FIG. 3 depicts a three pronged approach to combination of meso-scale numerical weather forecasting and parameter reduction techniques in some embodiments. In one example, the solar power forecasting system 104 utilizes mesoscale numerical weather prediction (NWP) distributed over an aggregation level (State, DU) amounting to a rich set of correlated input weather features for training the models. Over and above the net solar radiation, the set of input weather features includes angle of the sun, the localized snow accumulation (and melting), cloud cover and rain.

In some embodiments, the solar power forecasting system 104 utilizes generalized linear models with regularization (or parameter shrinkage) to avoid over-fitting which is caused due to correlation amongst the input weather features. This results in improved forecasting accuracy as compared to the prior art under all types of weather conditions.

In some embodiments, the solar power forecasting system 104 subsequently utilizes LASSO (Least Absolute Shrinkage and Selection Operator) regularization which allows not only shrinking weightage, but also selecting features (weightage=0), thus reducing the size of parameter space, and hence, the computational complexity of the forecasting model. In this example, LASSO may be utilized to generate a model which is more accurate than the average model and provides better prediction of reverse flow during highly sunny days.

Figure 4:
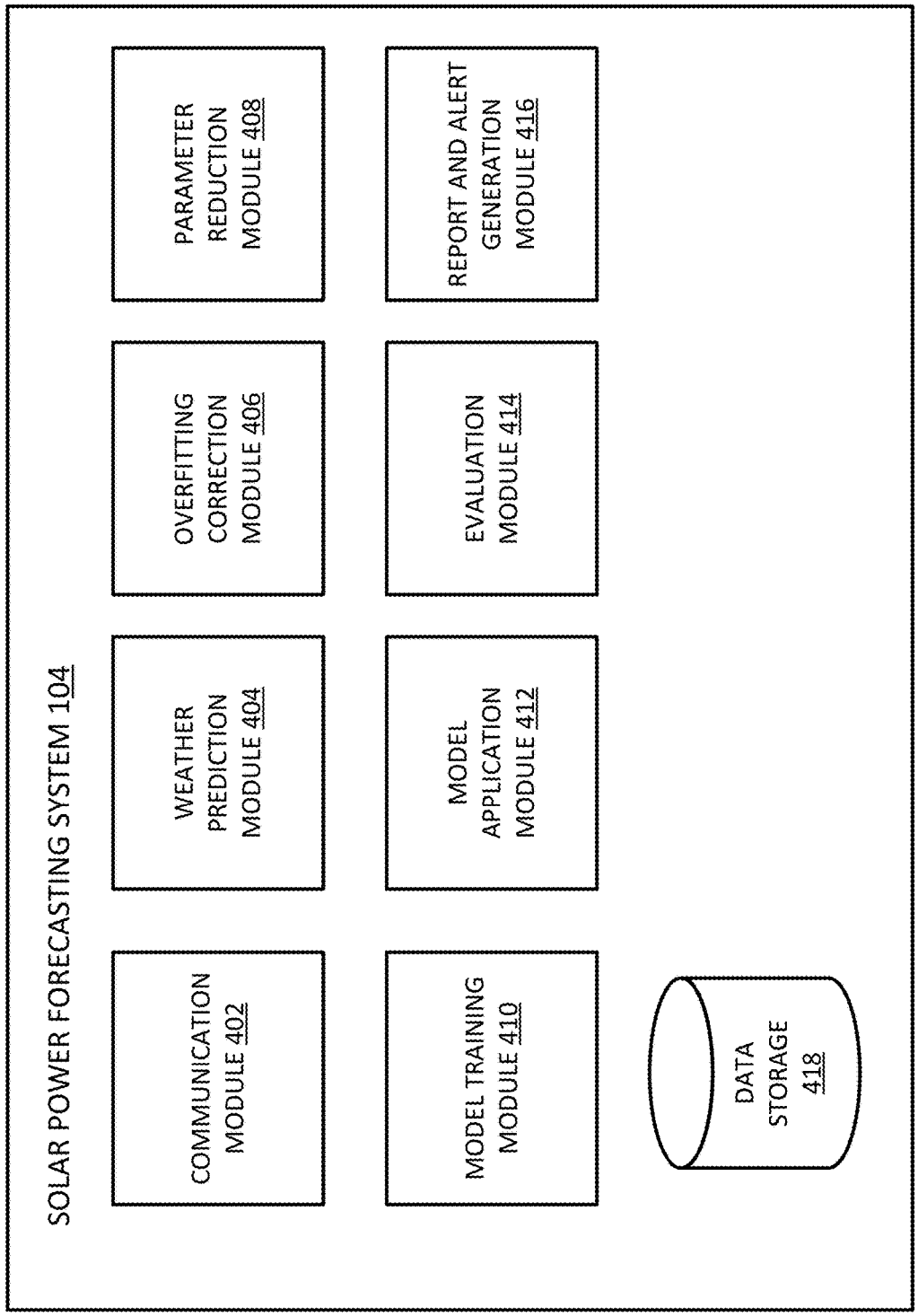
FIG. 4 is a block diagram of the solar power forecasting system in some embodiments.

FIG. 4 is a block diagram of the solar power forecasting system 104 in some embodiments. The solar power forecasting system 104 comprises a communication module 402, a weather prediction module 404, an overfitting correction module 406, a parameter reduction module 408, a model training module 410, a model application module 412, an evaluation module 414, a report and alert generation module 416, and a data storage 418.

The communication module 402 may be configured to transmit and receive data between two or more modules in the solar power forecasting system 104. In some embodiments, the communication module 402 is configured to receive information (e.g., historical meso-scale NWP predictions and/or historical power flow information) for a particular distribution area 112. The historical meso-scale NWP predictions may include different predictions for different portions (e.g., grids) within the distribution area 112. The historical power flow information may identify different power flows within or from different portions (e.g., grids) of the distribution area 112. In some embodiments, the historical power flow information may identify at least one power flow for any aggregation of portions of the distribution area 112.

The communication module 402 may be configured to receive the grid topology of the distribution area 112, forecasts of net demand in the distribution area 112, and/or other types of renewable resources. Reverse power flow may be predicted based on the forecasts discussed herein as well as based on the grid topology of the distribution area 112, forecasts of net demand in the distribution area 112, and/or other types of renewable resources in the distribution area 112.

In some embodiments, the historical power flow information may be from or regarding an electrical asset of an electrical network (e.g., substations 114, transformers 116, and/or transmission lines 118) or at any point in the distribution area 112. The historical meso-scale NWP predictions may be received from a weather service system 110, power system 106, and/or other digital entity. In some embodiments, The historical power flow information may be received from the power system 106. In various embodiments, the communication module 402 may provide alerts and reports to digital devices (e.g., text alerts to service personnel, systems of the power system 106, and/or the like).

In some embodiments, the weather prediction module 404 is configured to receive mesoscale numerical weather predictions from the weather service system 110 (e.g., via the communication module 402). Numerical Weather Prediction (NWP) employs equations for the flow of fluids to forecast weather. Each important physical process that cannot be directly predicted may require a parameterization scheme based on reasonable physical or statistical representations. High-resolution model, also called mesoscale models, such as the Weather Research and Forecasting model tend to use normalized pressure coordinates referred to as sigma coordinates. Mesoscale meteorology refers to weather systems that are smaller than synoptic scale but larger than microscale systems. Horizontal dimensions may range from around 5 kilometers to sever hundred kilometers.

In various embodiments, the weather prediction module 404 requests (e.g., via the communication module 402) an NWP for a particular geographical area. The particular geographical area may coincide with one or more power distribution areas that may contain any number of PV generators.

Figure 5:
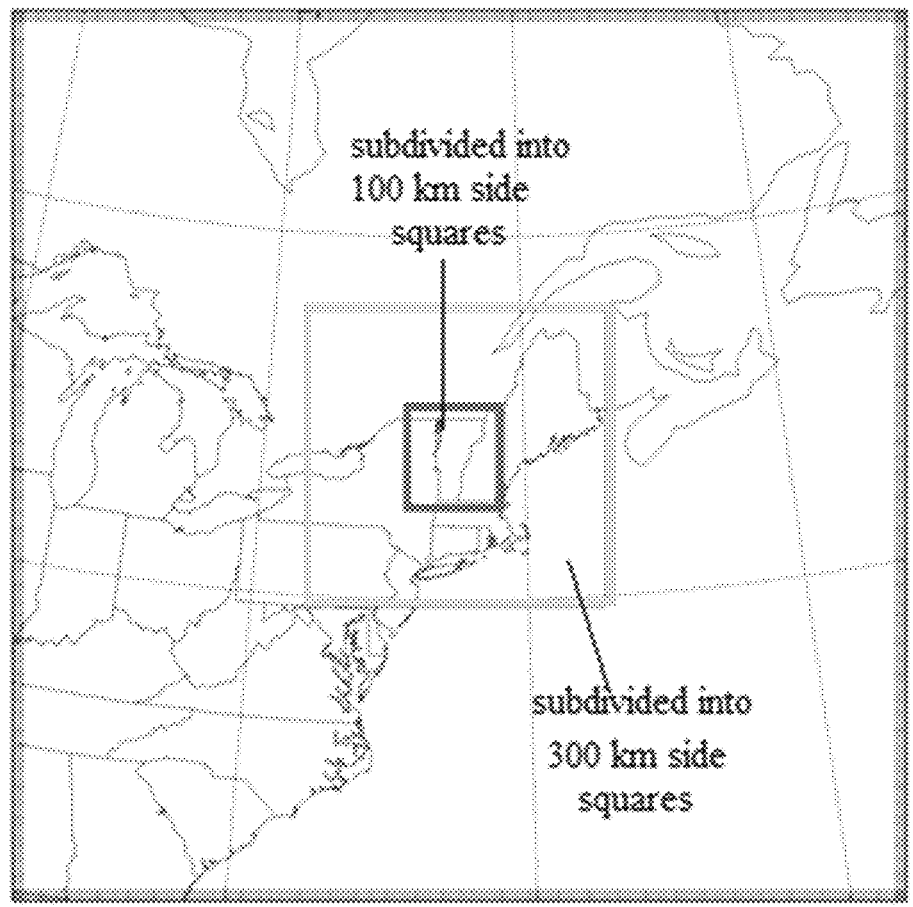
FIG. 5 depicts an example mesoscale weather forecasting region divided into several grids of different resolution.

As discussed herein, the weather service system 110 may utilize a mesoscale numerical weather service system that distinguishes local phenomena like clouds and snow-accumulation using, for example, 2700-900-300 km grid structures. FIG. 5 depicts an example mesoscale weather forecasting region divided into several grids of different resolution.

Figure 6:
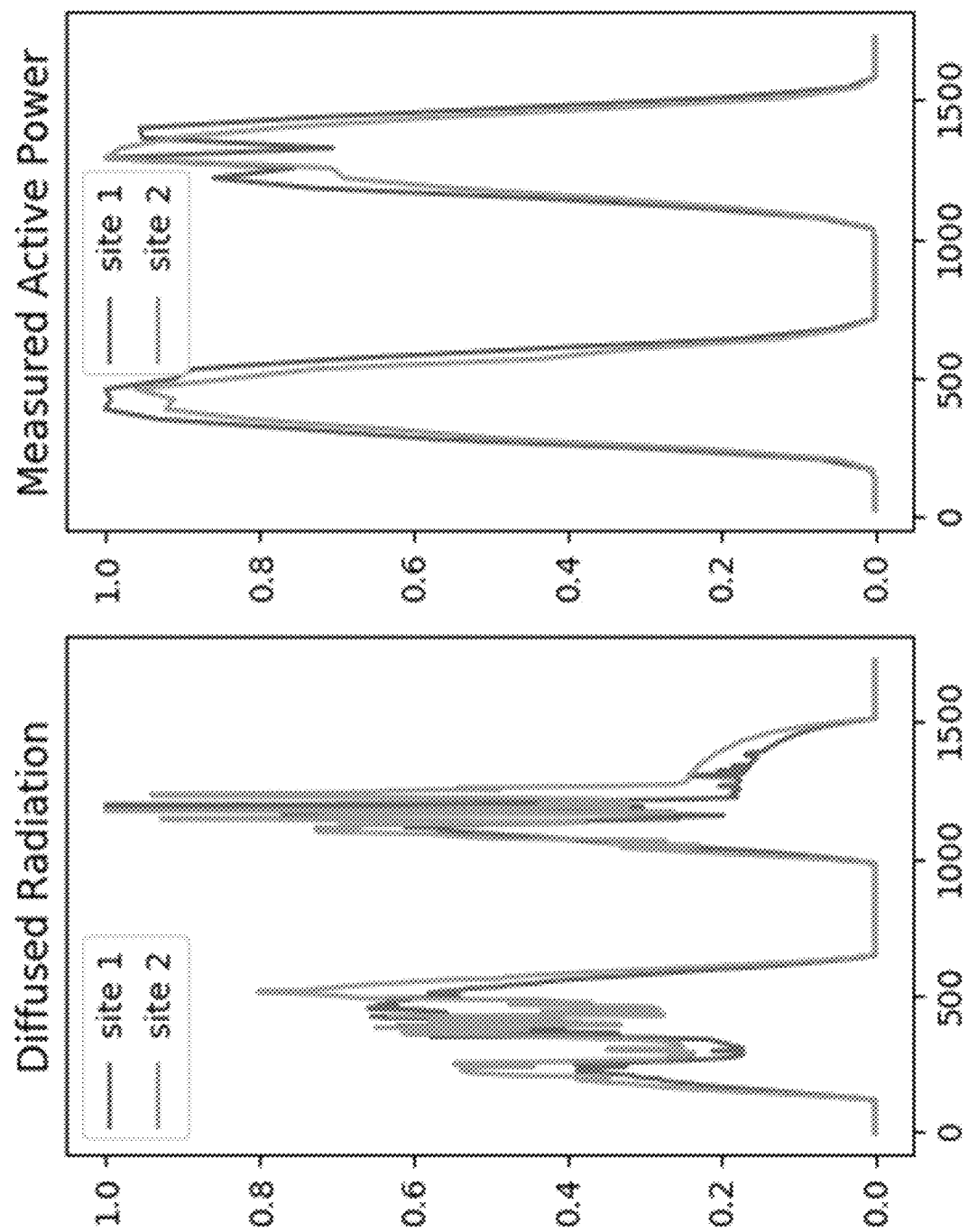
FIG. 6 depicts two graphs indicating a difference in solar irradiances (L) and measured power production (R) at two sites in Northeast United States separated by 15 km ground distance.

The weather service system 110, using the mesoscale numerical weather service system may predict a rich set of relevant weather features such as, without limitation to components of radiation, snow cover, temperature, and humidity as opposed to just using irradiance. FIG. 6 depicts two graphs indicating a difference in solar irradiances (L) and measured power production (R) at two sites in Northeast United States separated by 15 km ground distance. The 'local' phenomena causes lack of correlation in irradiances at close distances, which may be forecasted correctly using a mesoscale numerical weather prediction model (as opposed to other prior art models).

Figure 7:
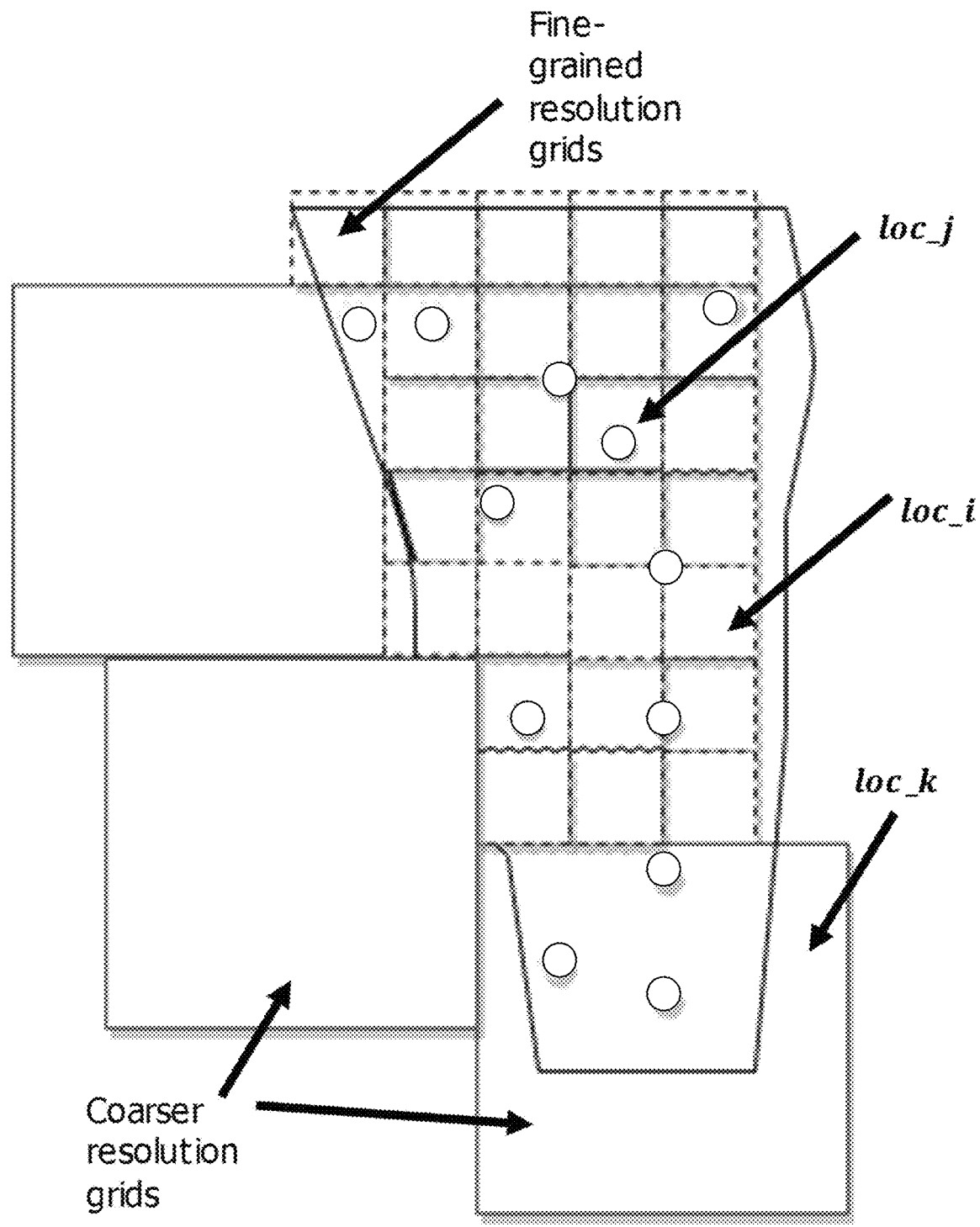
FIG. 7 is an example distribution area with grid marking for NWP predictions and clusters of PV generators.

The overfitting correction module 406 corrects overfitting for model training. The high-resolution (e.g., meso-scale) NWP may produce weather forecasts for every cell in a grid. FIG. 7 is an example distribution area with grid marking for NWP predictions and clusters of PV generators. It will be appreciated that distributed PV installations are increasing. This exacerbates the problem that PV installations are not completely visible to grid owners.

Grids in FIG. 7 depict fine-grain resolution while larger areas depict coarser resolution grids. Location k, j, and k are identified in FIG. 7 and used in equations herein.

A set of forecasted weather features at a location loc_i can be represented by a matrix X, $$X_{loc\_i} = [\underline{x}_{1,loc_i}, \underline{x}_{2,loc_i}, \underline{x}_{3,loc_i}, \ldots] \quad (1)$$

Where each of the $\underline{x}_{j,loc_i}$ represents a forecasted weather feature (like irradiance, temperature, etc) from an NWP prediction at the given location. The problem of forecasting the aggregated power production $\underline{Y}_{power}$ can then be stated as, Estimate $f$ where, $$\underline{Y}_{power} = f(X_{loc_1}, X_{loc_2}, X_{loc_3}, \ldots, X_{loc_n}) \quad (2)$$

The overfitting correction module 406 may minimize the loss (error) function, $$L(X) = |\underline{Y}_{power} - f(X)|_r^r \quad (3)$$

For some norm r. Where r usually is 1(mean absolute error) or 2 (mean squared error). In a specific implementation, the overfitting correction module 406 may utilize a generalized linear regression with parameter regularization, and the loss function takes the form, $$L(X) = |\underline{Y}_{power} - X\underline{\beta}|_r^r + \lambda |\underline{\beta}|_p \quad (4)$$

And the overfitting correction module 406 estimates, $$\hat{\beta}(\lambda) = \underset{\underline{\beta}}{\operatorname{argmin}} \left( \underline{Y}_{power} - X\underline{\beta}|_r^r + \lambda |\underline{\beta}|_p \right) \quad (5)$$

Where, $\lambda$ is the regularization parameter determined by cross-validation and choice of p indicates the type of regularization. In one example, for implementing the Least Absolute Shrinkage and Selection Operator (LASSO), the overfitting correction module 406 uses p=1, (r=1 or 2 usually), similarly p=2, for Ridge regression, and for elastic net the total penalty is: $(\lambda_1 |\underline{\beta}|_1 + \lambda_2 |\underline{\beta}|_2)$.

The parameter reduction module 408 may estimate the set of $\beta_{ji}$ (j: weather type, i: location), $$\underline{Y}_{power} = \beta_{11}\underline{x}_{1,loc_1} + \beta_{21}\underline{x}_{2,loc_1} + \ldots + \beta_{12}\underline{x}_{1,loc_2} + \beta_{22}\underline{x}_{2,loc_2} + \ldots$$

The size of the parameter space (the set of $\underline{x}_{j,loc_i}$) is very high and hence the number of $\beta_{ji}$ to be estimated is very large for higher accuracy. For example, $$Y_{power} = \beta_{11}\underline{Irradiance}_{1,loc_1} + \beta_{21}\underline{Temperature}_{2,loc_1} + \beta_{31}\underline{Snow}_{3,loc_1} + \ldots +$$
$$\beta_{12}x\underline{Irradiance}_{1,loc_2} + \beta_{22}\underline{Temperature}_{2,loc_2} + \beta_{32}\underline{Snow}_{3,loc_2} + \ldots$$

For instance, in a specific implementation for the distributed PV power production for the state of Vermont, the number of $\beta_{ji}$ to be estimated was around 4000, (assuming 500 spatial grids). In this example, by using the LASSO algorithm, the generalized regression module may achieve a high accuracy only with 25% of the variables (1000) selected by the algorithm. For example, when temperature is (highly) positively correlated with Irradiance, and negatively correlated with snow cover $$Y_{power} = \beta_{11}\underline{Irradiance}_{1,loc_1} + 0.\underline{Temperature}_{2,loc_1} + \beta_{31}\underline{Snow}_{3,loc_1} + \ldots +$$
$$\beta_{12}x\underline{Irradiance}_{1,loc_2} + 0.\underline{Temperature}_{2,loc_2} + \beta_{32}\underline{Snow}_{3,loc_2} + \ldots$$

leads to eliminating the temperature variable from all the thousand locations.

Figure 8A:
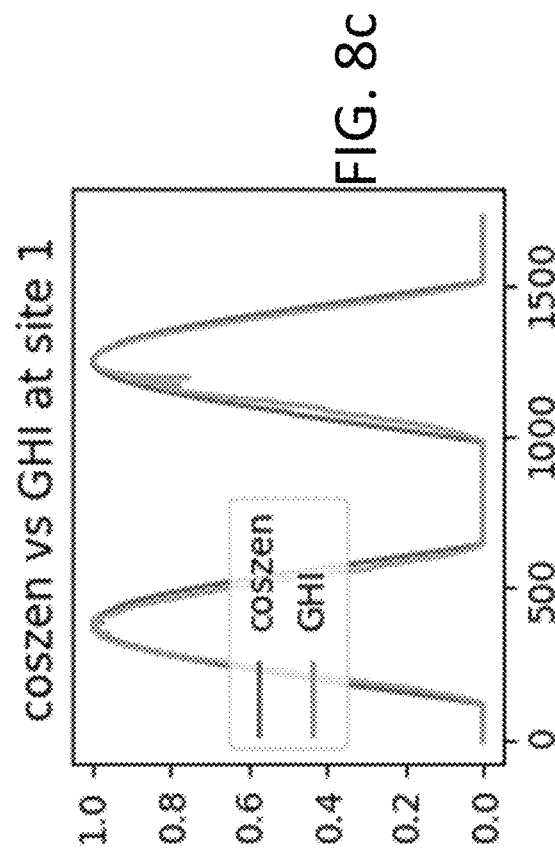
FIG. 8a depicts difference in solar irradiances (Left-Top) at two sites in NE-US separated by 15 km ground distance.
Figure 8B:
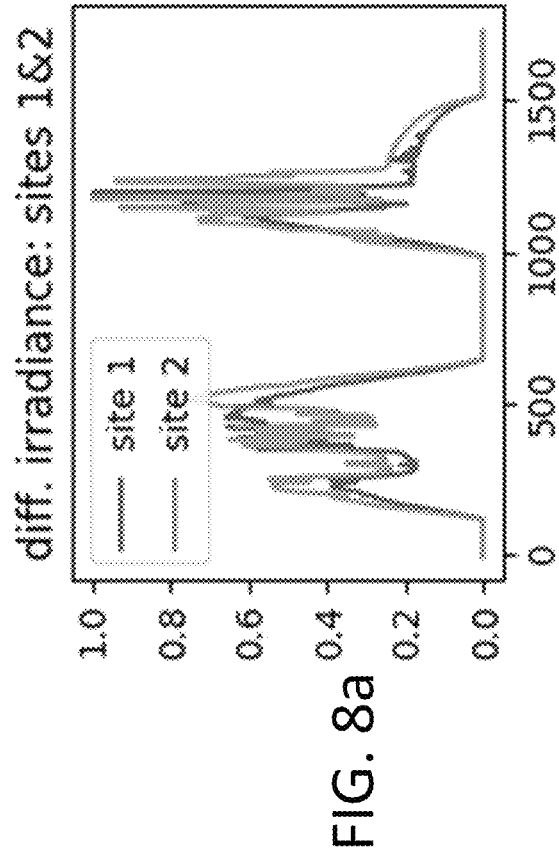
FIG. 8b depicts a scatter plot indicating weak correlation amongst solar irradiance at the same site.
Figure 8C:
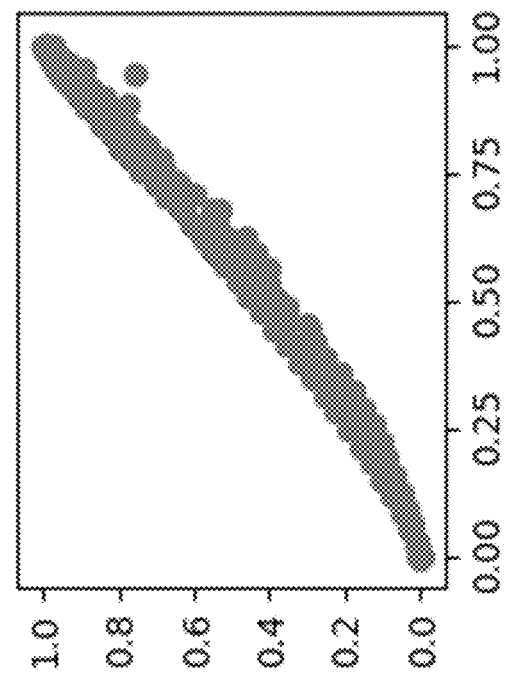
FIG. 8c depicts difference among two distinct weather features (cosine of zenith angle and solar irradiance) at the same location and their time-series data.
Figure 8D:
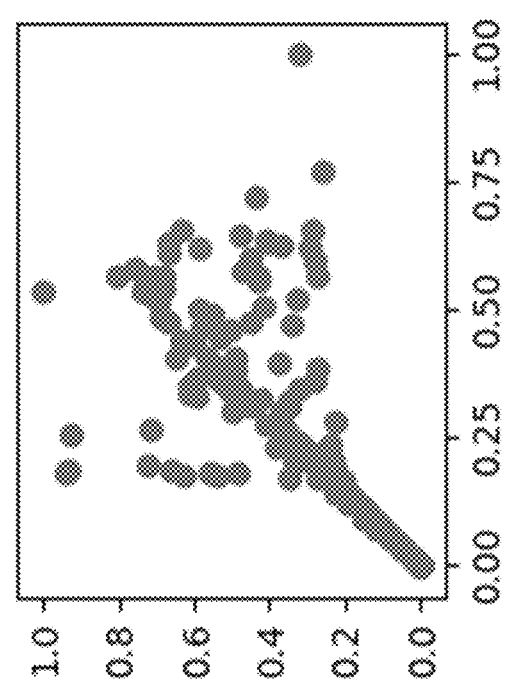
FIG. 8d depicts a strong positive correlation amongst the two distinct weather features of FIG. 8c

Whereas there is a lack of spatial correlation amongst weather features, there is a usually a high cross-correlation amongst distinct weather features forecasted for the same location. For example, FIG. 8a depicts difference in solar irradiances (Left-Top) at two sites in NE-US separated by 15 km ground distance. FIG. 8b depicts a scatter plot indicating weak correlation amongst solar irradiance at the same site. FIG. 8c depicts difference among two distinct weather features (cosine of zenith angle and solar irradiance) at the same location and their time-series data. FIG. 8d depicts a strong positive correlation amongst the two distinct weather features of FIG. 8c.

After parameter reduction, the parameter reduction module 408 provides the reduced, corrected weather to the model training module 410. In some embodiments, the parameter reduction module 408 may extract features from the historical data and/or create new features from the historical data. These features may encapsulate central properties of a data set and represent the data set and a low dimensional space that facilitates learning. As can be appreciated, the historical data may include multivariate data may include a number of features that are too large and unwieldy to be effectively managed and may require an unreasonable amount of computing resources. Feature extraction may be used to provide a more manageable representative subset of input variables. It will be appreciated that feature extraction may extract features for the data as well as create new features from the initial set of data.

In some embodiments, the parameter reduction module 408 or the overfitting correction module 406 may utilize dimensionality reduction to map historical data to a lower dimensional space. Historical data may be decomposed into components that represent one or more patterns. The components, or the parameters associated with the patterns, represent features of a time series that can be used in models. For example, historical data may be clustered into common patterns. Trend and classical decomposition may utilize a series of moving averages to decompose historical data to extract features.

In some embodiments, the parameter reduction module 408 reduces dimensionality of the problem of distributed PV power forecasting by determining the most correlated input features and eliminating a significant percentage of input features. This reduces computational complexity of training and scoring and reduces overfitting in predictions. This improves accuracy, scalability, and computational efficiency (thereby improving speed).

The model training module 410 may train one or more power flow models. In various embodiments, the parameter reduction module 408 provides the reduced (e.g., utilizing LASSO), corrected (e.g., utilizing overfitting correction) weather prediction to the model training module 410. The parameter reduction module 408 may receive historical power flows from the communication module 402. In various embodiments, the model training module 410 may utilize the historical reduced, corrected weather and the historical power flows for supervised learning such as k-nearest neighbor, neural networks, and the like.

In various embodiments, the model training module 410 may receive a second set of historical data (not used to train the power flow model) and utilize the second set of historical data to generate a solar power forecast and compare the solar power forecast to historical power flows to confirm accuracy and/or determine degree of accuracy.

The data storage 418 may store the power flow models generated by the model training module 410. The data storage 418 may enable logical retrieval of one or more power flow models based on current (e.g., new) sensor data for fault prediction.

The model application module 412 may apply the power flow model(s) generated by the model training module 410 to new meso-scale NWP prediction data. For example, once the power flow model(s) are generated, the solar power forecasting system 104 may receive current (e.g., new) meso-scale NWP prediction data from any number of weather service systems to provide solar power forecasting.

The evaluation module 414 may be configured to evaluate the results from the model application module 412. In various embodiments, the results from the application of the power flow model(s), the evaluation module 414 may apply thresholds or triggers to identify power flows and reverse power flows that may be caused, at least in part, by solar power flow (generated by one or more different PV generators in the geographic distribution area).

The report and alert generation module 416 may generate a report including the results of the application of the power flow model(s) to identify reverse power flows and potentially assets of an electrical network (e.g., substations or other assets) that may be impacted by predicted solar power.

The report and alert generation module 416 may provide the report to the operator, utility, maintenance service devices, and/or the like.

In various embodiments, the report and alert generation module 416 may generate an alert based on the results of the application of the power flow model(s). For example, the report and alert generation module 416 may provide alert communications (e.g., email, SMS text, phone calls, and/or the like) to devices to indicate a significant power flow (e.g., reverse power flow) caused by PV generation. The report and alert generation module 516 may compare the results from the application of the power flow model(s) to any number of criteria to determine significance. The criteria may include, but not be limited to, a threshold of reverse power flow. In some embodiments, the criteria may include different thresholds for different portions (e.g., grids) of the geographic area. For example, different assets in different parts of the geographic area may be impacted by different levels of power flow. As such, predictions of power flows at different portions of the geographic area (e.g., different predictions for different grids) may impact different electrical assets in the same portion of the geographic area differently. As such, different assets within the same grid of the geographic area may be associated with different thresholds. If the reverse power flow is greater than any of the thresholds, the report and alert generation module 516 may generate an alert.

Once a solar power forecast determines that one or more particular assets of a particular grid may be negatively impacted, the report and alert generation module 416 may identify different devices or systems to alert (e.g., the power system, alert personnel, administrators, or the like) for each affected system and provide alerts identifying the asset and the negative power flow predicted to enable safeguards.

The data storage 418 may include any number of data storage devices and or logical storage spaces. The data storage 418 may include, for example, any number of databases, tables, and/or any other data structures. The data storage 418 may be configured to store any amount of historical data, current meso-scale NWP predictions, current power flow, historical meso-scale NWP predictions, historical power flow, extracted features, generated power flow models, labels, results of application of power flow models to current meso-scale NWP predictions and current power flow, reports, and/or alerts.

Figure 9:
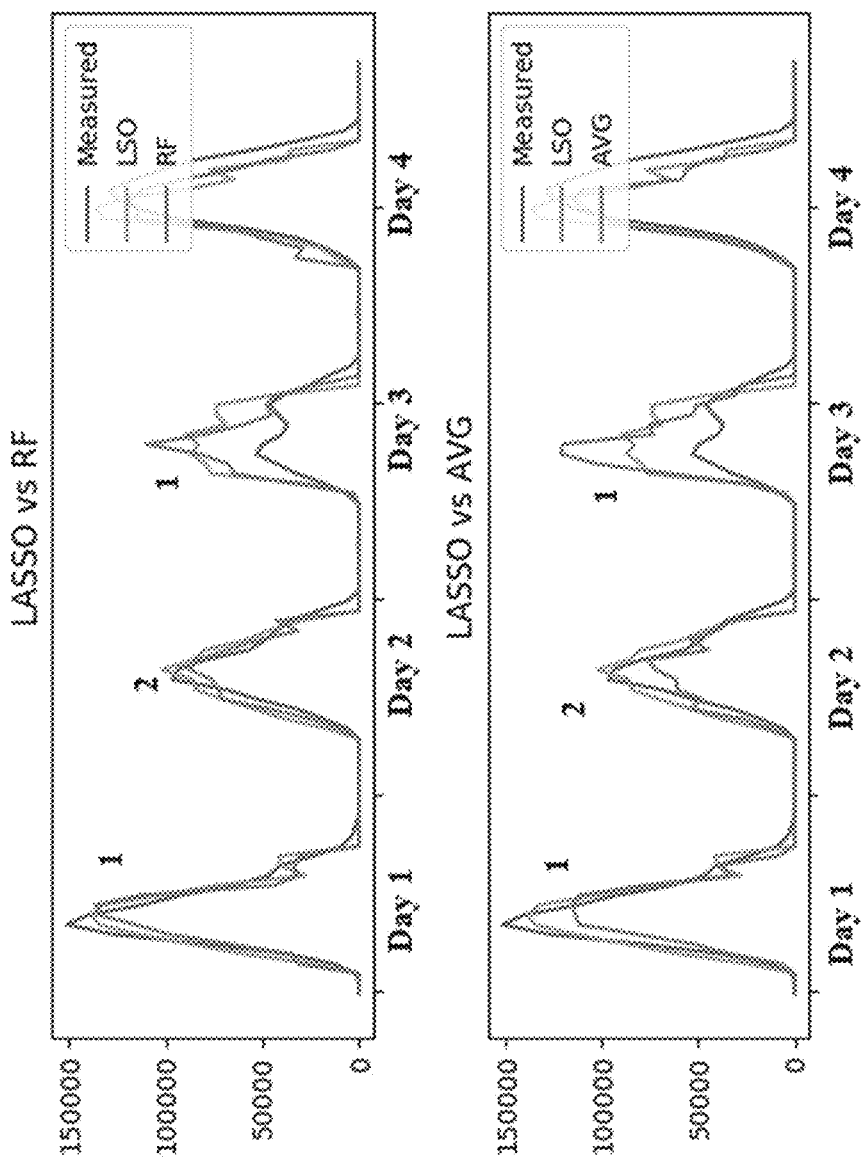
FIG. 9 depicts LASSO vs. random forest (RF) and LASSO vs. average (AVG) analytical systems in example results.

FIG. 9 depicts LASSO vs. random forest (RF) and LASSO vs. average (AVG) analytical systems in example results. In both charts, the LASSO results is better than alternative analytics.

Compared and tested several algorithms like Random Forest (RF), Support Vector Regression (SVR), LASSO (LSO) and RF with averaged features (AVG). Trained in using weather forecasts and measured power from one season (for example spring), and tested on other seasons (winter, summer). LASSO gives the best average accuracy and minimizes the difference between train and test-set errors (avoids over-fitting) as shown in the table below.

| | | Independent Features | | | | | | Avg. Features | |
|---|---|---|---|---|---|---|---|---|---|
| | | LASSO | | RF | | SVR | | RF | |
| Train Period | Test Period | Train | Test | Train | Test | Train | Test | Train | Test |
| Apr-18 | Jun-18 | 5.4165 | 7.6307 | 2.0209 | 8.8805 | 17.5650 | 24.4345 | 1.5448 | 8.9054 |
| | Mar-18 | | 8.0182 | | 8.5839 | | 23.0090 | | 8.5368 |

The table includes a comparison between Mean Absolute Percentage Errors (MAPE) in forecasting using the LASSO and Numerical Weather Forecasting (proposed) method and other state-of-the-art methods. 'Avg-Features' is Coarse-grained is using 'average' or coarse-grained forecasting. 'Independent Features' is using High-resolution (meso-scale) forecasting with LASSO (regularized) and RF, SVR (non-regularized) algorithms.

Figure 10:
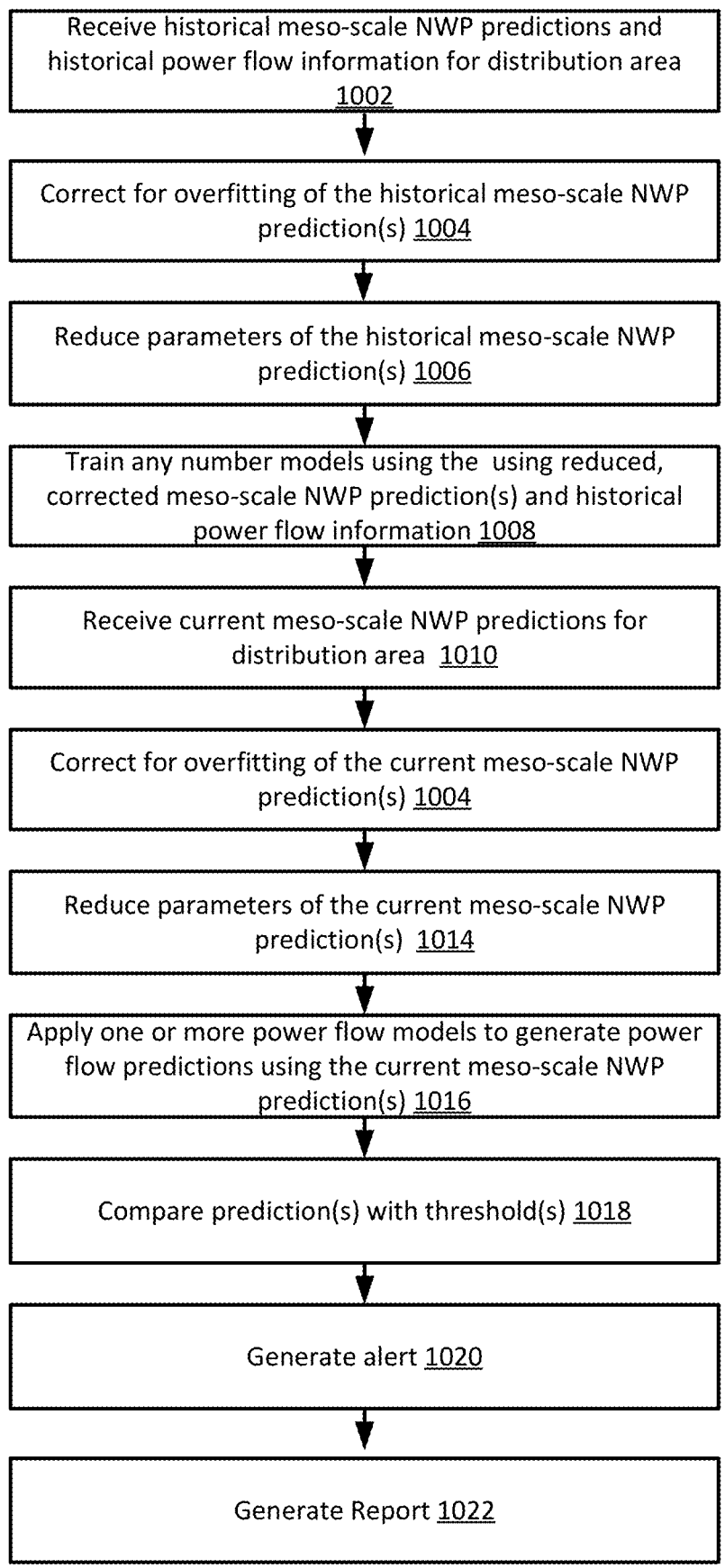
FIG. 10 depicts an example report for fault and prediction analysis for an electrical asset using information fusion.

FIG. 10 is a flowchart for predicting power flow for a distribution area 112 in some embodiments. In step 1002, the communication interface 402 receives historical meso-scale NWP predictions for the distribution area 112 and receives historical power flow information within and/or from the distribution area 112. The historical meso-scale NWP predictions for the distribution area 112 and receives historical power flow information within and/or from the distribution area 112 may be with regard to a particular period of time.

In step 1004, the overfitting correction module 406 corrects for overfitting of the information contained within the historical meso-scale NWP predictions for the distribution area 112. The overfitting correction module 406 may utilize generalized linear models with regularization (or parameter shrinkage) to avoid over-fitting caused by information within the historical meso-scale NWP predictions. The overfitting correction module 406 may apply overfitting correction for each prediction (e.g., for each grid) for the distribution area 112 creating any number of corrected historical meso-scale NWP predictions.

In step 1006, the parameter reduction module 408 applies regularization and feature selection to the corrected historical meso-scale NWP predictions in order to reduce the size of the parameter space of one or more corrected historical meso-scale NWP predictions thereby reducing complexity and improving scalability. The parameter reduction module 408 generates reduced, corrected historical meso-scale NWP prediction(s).

In step 1008, the model training module 410 trains any number of power flow models (e.g., different power flow models for different grids of the distribution area 112) using the reduced, corrected historical meso-scale NWP prediction(s) as well as the historical power flow information. For example, for a grid of the distribution area 112, the model training module 410 may train a power flow model using the reduced, corrected historical meso-scale NWP prediction for that grid as well as power flow information that includes at least some power flows that may be generated within the area of that grid.

In step 1010, the communication interface 402 receives current (new) meso-scale NWP predictions for the distribution area 112 within and/or from the distribution area 112 (e.g., the same distribution area 112 as in steps 1002-1008). The current meso-scale NWP predictions for the distribution area 112 and historical power flow information within and/or from the distribution area 112 may be with regard to a future period of time.

The model application module 412 may select a different power flow model for different grids of the distribution area 112 and utilize the selected power flow model(s) with the current (new) meso-scale NWP predictions for the distribution area 112 to predict power flows. In some embodiments, the current meso-scale NWP predictions may not be corrected for overfitting or parameters reduced. In various embodiments, the solar power forecasting system 104 may extract unneeded features based on the power flow models and/or structure the data from the current meso-scale NWP predictions before applying one or more power flow models. Alternately, the solar power forecasting system 104 may correct the current meso-scale NWP predictions for overfitting and reduce parameters before applying the power flow model(s).

In optional step 1012, the overfitting correction module 406 corrects for overfitting of the information contained within the current meso-scale NWP predictions for the distribution area 112. The overfitting correction module 406 may utilize generalized linear models with regularization (or parameter shrinkage) to avoid over-fitting caused by information within the current meso-scale NWP predictions. The overfitting correction module 406 may apply overfitting correction for each prediction (e.g., for each grid) for the distribution area 112 creating any number of corrected current meso-scale NWP predictions.

In optional step 1014, the parameter reduction module 408 applies regularization and feature selection to the corrected current meso-scale NWP predictions in order to reduce the size of the parameter space of one or more corrected current meso-scale NWP predictions thereby reducing complexity and improving scalability. The parameter reduction module 408 generates reduced, corrected current meso-scale NWP prediction(s).

It will be appreciated that, in some embodiments, optional step 1012 is performed without step 1014 before applying the power flow models to the current meso-scale NWP prediction(s). Alternately, in some embodiments, optional step 1014 is performed without step 1012 before applying the power flow models to the current meso-scale NWP prediction(s).

In step 1016, the evaluation module 414 evaluates the results of the application of the power flow model(s) to the current meso-scale NWP prediction(s) (e.g., the corrected, current meso-scale NWP prediction(s), the reduced, corrected current meso-scale NWP prediction(s), the reduced, current meso-scale NWP prediction(s), or the current meso-scale NWP prediction(s)).

In various embodiments, the results from the application of the power flow model(s), the evaluation module 414 may apply thresholds or triggers to identify power flows and reverse power flows within or being provided from the distribution area 112.

In step 1020, the report and alert generation module 416 may generate an alert based on the results of the application of the power flow model(s).

Once a solar power forecast determines that one or more particular assets of a particular grid may be negatively impacted, the report and alert generation module 416 may identify different devices or systems to alert (e.g., the power system, alert personnel, administrators, or the like) for each affected system and provide alerts identifying the asset and the negative power flow predicted to enable safeguards.

In step 1022, the report and alert generation module 416 may generate a report including the results of the application of the power flow model(s) to identify reverse power flows and potentially assets of an electrical network (e.g., substations or other assets) that may be impacted by predicted solar power. The report and alert generation module 416 may provide the report to the operator, utility, maintenance service devices, and/or the like.

Figure 11:
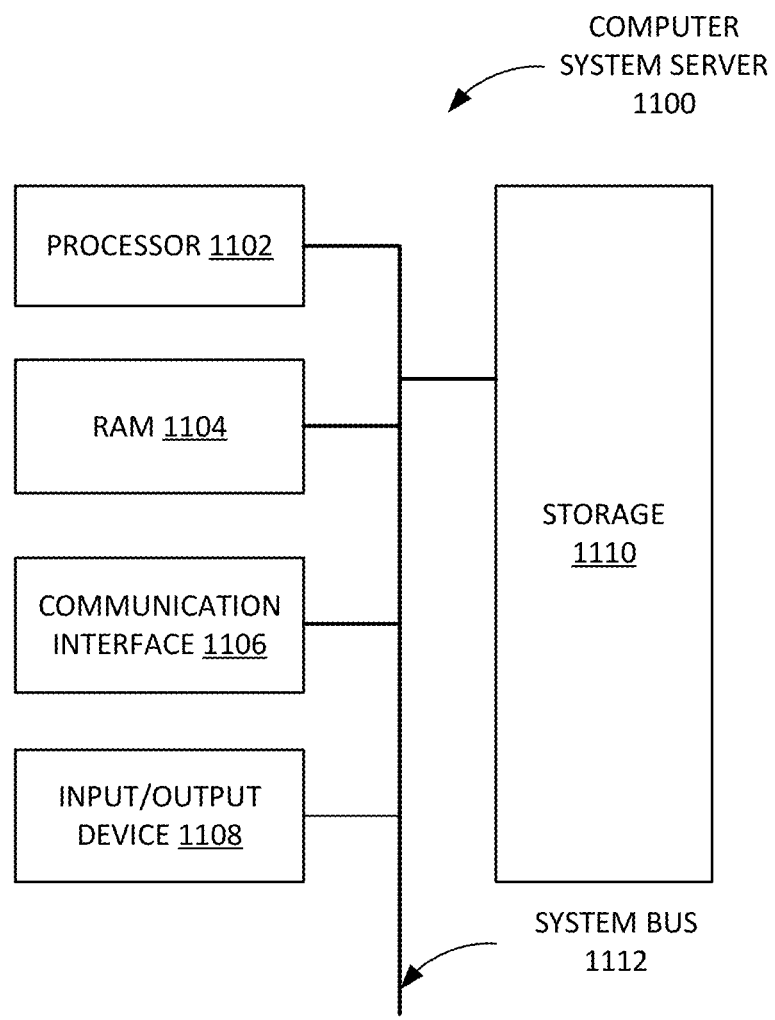
FIG. 11 depicts a block diagram of an example computer system according to some embodiments.

FIG. 11 depicts a block diagram of an example computer system 1100 according to some embodiments. Computer system 1100 is shown in the form of a general-purpose computing device. Computer system 1100 includes processor 1102, RAM 1104, communication interface 1106, input/output device 1108, storage 1110, and a system bus 1112 that couples various system components including storage 1110 to processor 1102.

System bus 1112 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 1100 typically includes a variety of computer system readable media. Such media may be any available media that is accessible by the computer system

1100 and it includes both volatile and nonvolatile media, removable and non-removable media.

In some embodiments, processor 1102 is configured to execute executable instructions (e.g., programs). In some embodiments, the processor 1102 comprises circuitry or any processor capable of processing the executable instructions.

In some embodiments, RAM 1104 stores data. In various embodiments, working data is stored within RAM 1104. The data within RAM 1104 may be cleared or ultimately transferred to storage 1110.

In some embodiments, communication interface 1106 is coupled to a network via communication interface 1106. Such communication can occur via Input/Output (I/O) device 1108. Still yet, the computer system 1100 may communicate with one or more networks such as a local area network (LAN), a general wide area network (WAN), and/or a public network (e.g., the Internet).

In some embodiments, input/output device 1108 is any device that inputs data (e.g., mouse, keyboard, stylus) or outputs data (e.g., speaker, display, virtual reality headset).

In some embodiments, storage 1110 can include computer system readable media in the form of volatile memory, such as read only memory (ROM) and/or cache memory. Storage 1110 may further include other removable/non-removable, volatile/non-volatile computer system storage media. By way of example only, storage 1110 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CDROM, DVD-ROM or other optical media can be provided. In such instances, each can be connected to system bus 1112 by one or more data media interfaces. As will be further depicted and described below, storage 1110 may include at least one program product having a set (e.g., at least one) of program modules that are configured to carry out the functions of embodiments of the invention. In some embodiments, RAM 1104 is found within storage 1110.

Program/utility, having a set (at least one) of program modules, such as those contained within the solar power forecasting system 104, may be stored in storage 1110 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the invention as described herein. A module may be hardware (e.g., ASIC, circuitry, and/or the like), software, or a combination of both.

It should be understood that although not shown, other hardware and/or software components could be used in conjunction with the computer system 1100. Examples, include, but are not limited to: microcode, device drivers, redundant processing units, and external disk drive arrays, RAID systems, tape drives, and data archival storage systems, etc.

Exemplary embodiments are described herein in detail with reference to the accompanying drawings. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of one or more embodiments may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The invention claimed is:

1. A non-transitory computer readable medium comprising executable instructions, the executable instructions being executable by one or more processors to perform a method, the method comprising:
receiving first historical meso-scale numerical weather predictions (NWP) for a first geographic distribution area for a first time period;
receiving first power flow information for the first geographic distribution area of the first time period;
correcting for overfitting of the first historical meso-scale NWP predictions to reduce correlations within the first historical meso-scale NWP predictions and improve accuracy and create first corrected historical meso-scale NWP predictions;
training first power flow models using the first corrected historical meso-scale NWP predictions and the first power flow information for all or parts of the first geographic distribution area;
receiving first current meso-scale numerical weather predictions (NWP) for the first geographic distribution area for a first future time period;
applying any number of first power flow models to the first current meso-scale numerical weather predictions (NWP) to generate any number of power flow predictions that predict power flow within or from portions of the first geographic distribution area;
comparing one or more of the any number of power flow predictions to one or more first thresholds to determine significance of reverse power flows; and
generating a first report including at least one prediction of the reverse power flow based on the comparison and identifying the first geographic distribution area that may be impacted by the at least one prediction of the reverse power flow.

2. The non-transitory computer readable medium of claim 1, the method further comprising identifying a portion of the first geographic distribution area, identifying one or more electrical assets that distributes power to the portion of the first geographic distribution area, and generating an alert to a digital device based on the at least one prediction of the reverse power flow that may impact the one or more electrical assets that distributes power to the portion of the first geographic distribution area.

3. The non-transitory computer readable medium of claim 2, wherein the one or more electrical assets that distributes power to the portion of the first geographic distribution area includes at least one substation and the alert is delivered to a digital device authorized to receive alerts for that at least one substation.

4. The non-transitory computer readable medium of claim 2, wherein the one or more electrical assets that distributes power to the portion of the first geographic distribution area includes at least two different substations and the alert is delivered to at least one digital device authorized to receive alerts for at least one of the at least two different substations.

5. The non-transitory computer readable medium of claim 1, the method further comprising:
receiving second historical meso-scale numerical weather predictions (NWP) for a second geographic distribution area for a first time period;
receiving second power flow information for the second geographic distribution area of the first time period;
training second power flow models using the second historical meso-scale NWP predictions and the second power flow information for all or parts of the second geographic distribution area, the training of the second power flow models being at substantially a similar time as training the first power flow models due to improved scalability of model creation;
receiving second current meso-scale numerical weather predictions (NWP) for the second geographic distribution area for a second future time period;
applying any number of second power flow models to the second current meso-scale numerical weather predictions (NWP) to generate any number of power flow predictions that predict power flow within or from portions of the second geographic distribution area;
comparing one or more of the any number of power flow predictions to one or more second thresholds to determine significance of reverse power flows; and
generating a second report including at least one prediction of the reverse power flow based on the comparison and identifying the second geographic distribution area that may be impacted by the at least one prediction of the reverse power flow.

6. The non-transitory computer readable medium of claim 5, wherein the one or more first thresholds are different than the one or more second thresholds, the one or more first thresholds being based on an attribute of a first electrical asset that distributes power within the first geographic area, and the one or more second thresholds being based on an attribute of a second electrical asset that distributes power within the second geographic area.

7. The non-transitory computer readable medium of claim 1, wherein applying the any number of first power flow models to the first current meso-scale numerical weather predictions (NWP) to generate the any number of power flow predictions that predict the power flow within or from portions of the first geographic distribution area further comprises correcting for overfitting of the first current meso-scale NWP predictions to reduce correlations within the first current meso-scale NWP predictions prior to applying the any number of first power flow models.

8. The non-transitory computer readable medium of claim 7, wherein applying the any number of first power flow models to the first current meso-scale numerical weather predictions (NWP) to generate the any number of power flow predictions that predict the power flow within or from portions of the first geographic distribution area further comprises reducing parameters in the current meso-scale NWP predictions prior to applying the any number of first power flow models but after correcting for overfitting.

9. The non-transitory computer readable medium of claim 1, further comprising correcting for overfitting of the first historical meso-scale NWP predictions to reduce correlations within the first historical meso-scale NWP predictions and improve accuracy and to create first corrected historical meso-scale NWP predictions, and wherein training the first power flow models using the first historical meso-scale NWP predictions comprises training the first power flow models using the first corrected historical meso-scale NWP predictions.

10. The non-transitory computer readable medium of claim 1, further comprising reducing parameters in the first historical meso-scale NWP predictions to improve scalability and to create first reduced historical meso-scale NWP predictions, and wherein training the first power flow models using the first historical meso-scale NWP predictions comprises training the first power flow models using the first reduced historical meso-scale NWP predictions.

11. The non-transitory computer readable medium of claim 9, wherein correcting for overfitting of the first historical meso-scale NWP predictions to reduce the correlations within the first historical meso-scale NWP predictions comprises applying a Least Absolute Shrinkage and Selection Operator (LASSO) to all or part of the first historical meso-scale NWP predictions.

12. A system, comprising:
at least one processor; and
memory containing instructions, the instructions being executable by the at least one processor to:
receive a first historical meso-scale numerical weather predictions (NWP) for a first geographic distribution area for a first time period;
receive first power flow information for the first geographic distribution area of the first time period;
correct for overfitting of the first historical meso-scale NWP predictions to reduce correlations within the first historical meso-scale NWP prediction and improve accuracy and create first corrected historical meso-scale NWP predictions;
train first power flow models using the first corrected historical meso-scale NWP predictions and the first power flow information for all or parts of the first geographic distribution area;
receive first current meso-scale numerical weather predictions (NWP) for the first geographic distribution area for a first future time period;
apply any number of first power flow models to the first current meso-scale numerical weather predictions (NWP) to generate any number of power flow predictions that predict power flow within or from portions of the first geographic distribution area;
compare one or more of the any number of power flow predictions to one or more first thresholds to determine significance of reverse power flows; and
generate a first report including at least one prediction of the reverse power flow based on the comparison and identifying the first geographic distribution area that may be impacted by the at least one prediction of the reverse power flow.

13. The system of claim 12, the instructions being executable by the at least one processor to further identify a portion of the first geographic distribution area, identify one or more electrical assets that distributes power to the portion of the first geographic distribution area, and generate an alert to a digital device based on the at least one prediction of the reverse power flow that may impact the one or more electrical assets that distributes power to the portion of the first geographic distribution area.

14. The system of claim 13, wherein the one or more electrical assets that distributes power to the portion of the first geographic distribution area includes at least one substation and the alert is delivered to a digital device authorized to receive alerts for that at least one substation.

15. The system of claim 13, wherein the one or more electrical assets that distributes power to the portion of the first geographic distribution area includes at least two different substations and the alert is delivered to at least one digital device authorized to receive alerts for at least one of the at least two different substations.

16. The system of claim 12, the instructions being executable by the at least one processor to further:
receive second historical meso-scale numerical weather predictions (NWP) for a second geographic distribution area for a first time period;
receive second power flow information for the second geographic distribution area of the first time period;
train second power flow models using the second historical meso-scale NWP predictions and the second power flow information for all or parts of the second geographic distribution area, the training of the second power flow models being at substantially a similar time as training the first power flow models due to improved scalability of model creation;
receive second current meso-scale numerical weather predictions (NWP) for the second geographic distribution area for a second future time period;
apply any number of second power flow models to the second current meso-scale numerical weather predictions (NWP) to generate any number of power flow predictions that predict power flow within or from portions of the second geographic distribution area;
compare one or more of the any number of power flow predictions to one or more second thresholds to determine significance of reverse power flows; and
generate a second report including at least one prediction of the reverse power flow based on the comparison and identifying the second geographic distribution area that may be impacted by the at least one prediction of the reverse power flow.

17. The system of claim 16, wherein the one or more first thresholds are different than the one or more second thresholds, the one or more first thresholds being based on an attribute of a first electrical asset that distributes power within the first geographic area, and the one or more second thresholds being based on an attribute of a second electrical asset that distributes power within the second geographic area.

18. The system of claim 12, wherein applying the any number of first power flow models to the first current meso-scale numerical weather predictions (NWP) to generate the any number of power flow predictions that predict the power flow within or from portions of the first geographic distribution area further comprises correcting for overfitting of the first current meso-scale NWP predictions to reduce correlations within the first current meso-scale NWP predictions prior to applying the any number of first power flow models.

19. The system of claim 18, wherein applying the any number of first power flow models to the first current meso-scale numerical weather predictions (NWP) to generate the any number of power flow predictions that predict the power flow within or from portions of the first geographic distribution area further comprises reducing parameters in the current meso-scale NWP predictions prior to applying the any number of first power flow models but after correcting for overfitting.

20. The system of claim 12, the instructions being executable by the at least one processor to further correct for overfitting of the first historical meso-scale NWP predictions to reduce correlations within the first historical meso-scale NWP predictions and improve accuracy and to create first corrected historical meso-scale NWP predictions, and wherein training the first power flow models using the first historical meso-scale NWP predictions comprises the instructions being executable by the at least one processor to train the first power flow models using the first corrected historical meso-scale NWP predictions.

21. The system of claim 12, the instructions being executable by the at least one processor to further reduce parameters in the first historical meso-scale NWP predictions to improve scalability and to create first reduced historical meso-scale NWP predictions, and wherein training the first power flow models using the first historical meso-scale NWP predictions comprises the instructions being executable by the at least one processor to train the first power flow models using the first reduced historical meso-scale NWP predictions.

22. The system of claim 20, wherein the instructions being executable by the at least one processor to correct for overfitting of the first historical meso-scale NWP predictions to reduce the correlations within the first historical meso-scale NWP predictions comprises the instructions being executable by the at least one processor to apply a Least Absolute Shrinkage and Selection Operator (LASSO) to all or part of the first historical meso-scale NWP predictions.

23. A method comprising:
receiving first historical meso-scale numerical weather predictions (NWP) for a first geographic distribution area for a first time period;
receiving first power flow information for the first geographic distribution area of the first time period;
correcting for overfitting of the first historical meso-scale NWP predictions to reduce correlations within the first historical meso-scale NWP predictions and improve accuracy and create first corrected historical meso-scale NWP predictions;
training first power flow models using the first corrected historical meso-scale NWP predictions and the first power flow information for all or parts of the first geographic distribution area;
receiving first current meso-scale numerical weather predictions (NWP) for the first geographic distribution area for a first future time period;
applying any number of first power flow models to the first current meso-scale numerical weather predictions (NWP) to generate any number of power flow predictions that predict power flow within or from portions of the first geographic distribution area;
comparing one or more of the any number of power flow predictions to one or more first thresholds to determine significance of reverse power flows; and
generating a first report including at least one prediction of the reverse power flow based on the comparison and identifying the first geographic distribution area that may be impacted by the at least one prediction of the reverse power flow.

\* \* \* \* \*